(12) United States Patent
Sciarra

(10) Patent No.: US 6,326,567 B1
(45) Date of Patent: Dec. 4, 2001

(54) MULTI-POLE BREAKER ASSEMBLY

(75) Inventor: Sandro Sciarra, Rome (IT)

(73) Assignee: Enel Distribuzione S.p.A., Rome (IT)

( * ) Notice: Subject to any disclaimer, the term of this patent is extended or adjusted under 35 U.S.C. 154(b) by 0 days.

(21) Appl. No.: 09/474,563

(22) Filed: Dec. 29, 1999

(30) Foreign Application Priority Data

Jan. 5, 1999 (EP) ................................................. 99830001

(51) Int. Cl.⁷ ................................................. H01H 31/00
(52) U.S. Cl. ................................. 200/48 V; 200/48 R
(58) Field of Search ................................. 200/48 V, 48 R, 200/50.23, 50.25; 361/600–624; 218/97, 98

(56) References Cited

U.S. PATENT DOCUMENTS

| | | |
|---|---|---|
| 1,832,833 | 11/1931 | Rugg . |
| 1,862,169 | 6/1932 | Wood . |
| 5,357,068 | 10/1994 | Rozier . |

FOREIGN PATENT DOCUMENTS

| | | |
|---|---|---|
| 1 640 019 | 9/1971 | (DE) . |
| 0 543 683 A1 | 5/1993 | (EP) . |
| 0 731 481 A1 | 9/1996 | (EP) . |
| 0 758 138 A1 | 2/1997 | (EP) . |

*Primary Examiner*—Michael L. Gellner
*Assistant Examiner*—Nhung Nguyen
(74) *Attorney, Agent, or Firm*—Ladas & Parry

(57) ABSTRACT

A multi-pole breaker assembly (1) and a method for operating distribution systems (51) for primary stations that include said assemblies (1) allow to arrange metallic bays (2) for said assemblies (1) with reduced transversal dimensions, thus realising modular and compact distribution system (51), suitable for transportable solutions, said multi-pole breaker assembly (1) comprising breakers (4a, 4b, 4c) having a respective insulating feedthrough (29) developing along the median axis (A, B, C) thereof, wherein said breakers (4a, 4b, 4c) are arranged thereby the external terminals (30, 31) thereof being arranged onto a rectilinear pathway substantially parallel to the median axis (A, B, C) of said breakers (4a, 4b, 4c), and comprising means for translating (44) said breakers (4a, 4b, 4c) according to a direction having a main component substantially parallel to said median axes (A, B, C) to carry out and remove said line disconnection.

27 Claims, 5 Drawing Sheets

MULTI-POLE BREAKER ASSEMBLY

BACKGROUND OF THE INVENTION

1. Field of the Invention

The present invention relates, in general, to a multi-pole breaker assembly, of the type adopted within the field of the so-called medium voltage distribution system for the primary stations. The present invention further relates to a method for operating a distribution system of medium voltage, in particular for primary stations, including at least one multi-pole breaker assembly.

In particular, said multi-pole breaker assembly is of the type comprising breakers, each having an insulating case developing along a prevailing direction thereof, forming the median axis of each breaker, the median axes of the breakers of said assembly being substantially parallel among them, said breakers being apt to be moved with respect to respective input and output external contact to carry out a line disconnection.

2. Description of the Prior Art

The term multi-pole breaker assembly is used to indicate an electrical apparatus that carries out both the function of breaking, i.e. the cut-off and the make of an electric circuit, in presence of the normal operating current as well as in presence of the short-circuit current.

Moreover, by moving said breakers the disconnection of the network connected thereof is also performed, for instance the disconnection of medium voltage lines outgoing from a primary station.

This type of apparatus, within the range of the so-called medium voltage (1–52 kV), uses breakers comprising a fixed internal contact and a movable internal contact, apt to interact between them to open and to close the circuit. Both the internal contacts are connected with suitable input and output conductive rods, to respective outer terminals usually arranged at the ends of the insulating case.

The assemblies of the specified type can use a wide range of breakers that are distinguishable among them for their structure and for the implied dielectric medium, wherein said internal contacts are immersed, which carry out the function of shutting off the electric discharge that is formed when a current circulates therein.

The most common medium voltage breakers are of the type: with reduced oil; with air, so-called magnetic blow out breakers; and with sulphur hexafluoride (SF6). A few years ago, and with some success, breakers wherein the separation of the internal contacts takes place in a vacuum, i.e. the so-called vacuum bottle breakers were introduced. This latter type of breakers is particularly compact, light, and allowed a reduction in the sizes of the distribution systems.

This reduction could entail obvious advantages in terms of cost-effectiveness, allowing the realisation of the above-mentioned distribution system in a transportable solution and allowing the use thereof in primary stations, either in emergency situations or in stationary installations.

In a distribution system, a multi-pole breaker assembly comprises a metallic wall bay, wherein it is normally housed, and that forms a sort of cell or module of said distribution system.

The electrical insulation between the metallic walls and each breaker is ensured by the distance in air separating the two components, and specific rules do exist to provide certain insulation distances in air for electrical equipment that are therefore called air insulated, precisely to prevent the sparkling of sudden electrical arcs between the components, possibly in case of overvoltages.

Obviously, such minimum insulation distances must be kept regardless of the position of the breakers that, as aforestated, are moved to operate the steps of connecting the line, or the disconnection thereof.

Having to keep these minimum distances, the known multi-pole breaker assemblies do not permit, in said positions, to reduce the transversal dimensions of said bays of the assemblies that would allow, for instance, the creation of standardised modules of the distribution system, forming a transportable structure, suitable to various uses as a medium voltage section transportable to primary stations.

As a matter of fact, such assemblies mainly can be divided into two different categories.

Within the first category, multi-pole breaker assemblies can be found wherein the positions of connection and of disconnection of the line are carried out with an horizontal translation movement, i.e. perpendicular to said median axes. This type of assemblies has transversal dimensions that must take into account the translated positions of the set of breakers.

In the second category assemblies can be found wherein the breakers are rotated, rather than translated, around an axis of rotation substantially perpendicular to said median axes. This rotation, having to take place inside of a space internal to the bay, does not allow to optimise the sizes of the latter, particularly widthwise.

An assembly of this type is described for instance in the European Patent No. 0,543,683.

SUMMARY OF THE INVENTION

The technical problem underlying the present invention is that of providing a multi-pole breaker assembly as to overcome the drawbacks mentioned with reference to the prior art, optimising the sizes of the assembly and of the bay thereof.

This problem is solved by a multi-pole breaker assembly as specified above, further comprising means for translating said breakers according to a direction having a main component substantially parallel to said median axes, to operate the line connection and the line disconnection, said median axes being substantially vertical and substantially lying onto a median vertical plane perpendicular to said bus bars.

The present invention further relates to a method for operating medium voltage distribution systems for primary stations incorporating at least one multi-pole breaker assembly as specified above, comprising the steps of:

arranging said breakers thereby the external terminals thereof being arranged onto a rectilinear pathway, substantially parallel to the median axes of said breakers, intersecting the respective external input and output contacts thereof, said median axes being substantially vertical and substantially lying onto a median vertical plane perpendicular to said bus bars;

to operate the disconnection, moving said breakers thereby the respective external terminals thereof moving along said pathway from a position of electrical connection until placing themselves at a predetermined disconnection distance; and to operate the connection, moving said breakers thereby the respective external terminals thereof moving along said pathway from said predetermined disconnection distance to carry out an electrical connection.

The main advantage that can be achieved thanks to the above defined multi-pole breaker assembly and to the operation method thereof, consists in the possible encasement of said assemblies in a metal bay having reduced transversal dimensions, keeping nevertheless the required insulation distances in air, with the consequent possibility of realising distribution system that are modular and compact, as well as remarkably suitable for primary stations apt for solutions of transportable use.

This reduction in the transversal dimensions of the bay is provided by the fact that the breakers are vertically moveable with respect to the external contacts and also by the perpendicular arrangement of the median axes of these breakers with respect to the external bus bars.

In particular, using breakers that are compact and light such as those with a vacuum bottle specified above, the arrangement of the assemblies into of a modular type for a medium voltage distribution is made possible.

The arrangement of the breakers in each assembly, entailing that the breaker median axes lye onto a vertical plane perpendicular to the external bus bars, facilitates frontal access to the connections with the external contacts. This feature provides the possibility of arranging the bays onto two rows placed shoulder to shoulder, obtaining a complete medium voltage section, remaining within the limits of an ordinary road clearance, i.e. with a width not exceeding 2.5 m.

DESCRIPTION OF THE PREFERRED EMBODIMENT

Figure 4:
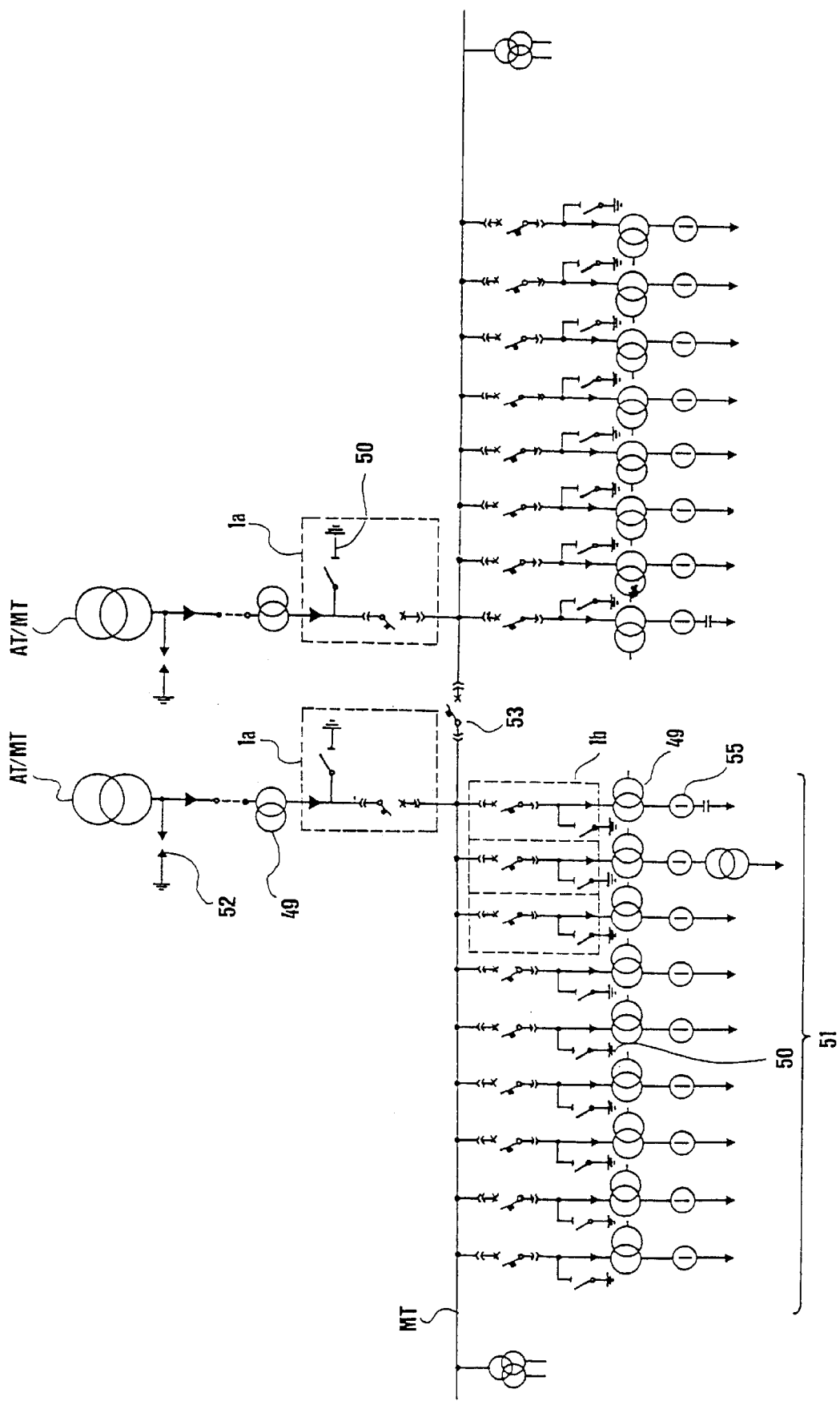
FIG. 4 shows a schematic unifilar view of a medium voltage distribution system including assemblies of the preceding figures.

With reference to FIG. 4, a medium voltage distribution system 51 for primary stations is schematically represented, including multi-pole breaker assemblies, indicated in a dotted line and with the reference numbers 1a and 1b.

The representation of FIG. 4 is of the unifilar type, i.e. the line of medium voltage MT, supplied by a high voltage-medium voltage AT/MT transformer through a multi-pole breaker assembly of a transformer 1a, supplies in turn a single row of multi-pole breaker assemblies 1b. In figure two branches of said medium voltage line MT are represented, supplied by transformers AT/MT in parallel, usually separated in operation by a suitable bus bar joiner 53.

As it can be understood from this diagram, all the assemblies 1a, 1b of the distribution system 51 are of a type that can be extracted and remotely controlled, i.e. comprise a set of breakers, detailed hereinafter, that can be extracted from the respective bays when the assembly 1a, 1b is on the disconnection mode.

Figure 1:
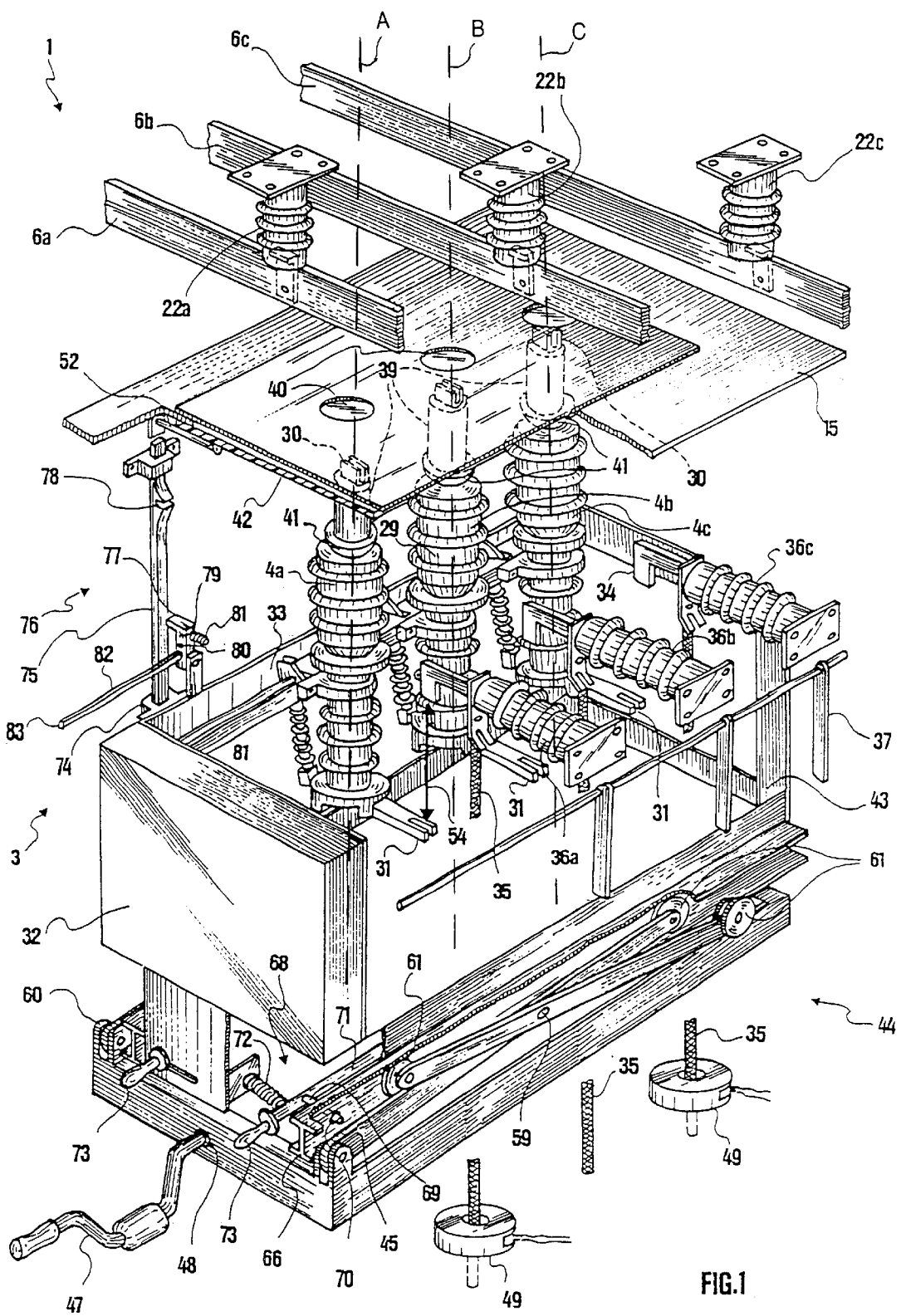
FIG. 1 shows a partial section perspective view of a multi-pole breaker assembly according to the present invention, in a first operative position called disconnection.
Figure 2:
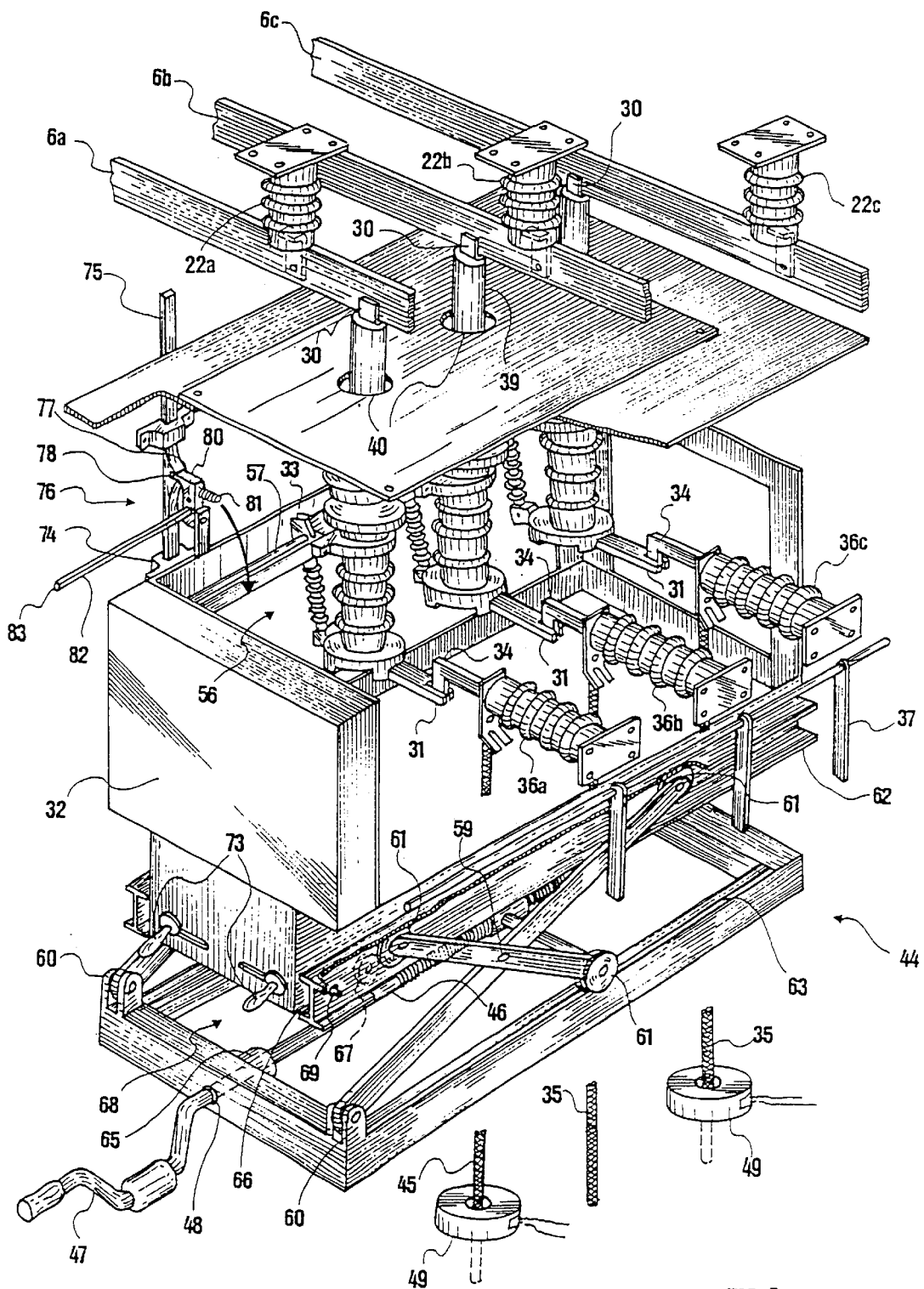
FIG. 2 shows a partial section perspective view of the assembly of FIG. 1, in a second operative position called connection.

Each assembly 1a, 1b has a pair of measuring and protection current transformers 49, whereby a low voltage current is drawn to be used for the various measuring and protection, and a grounding having a respective grounding blade switch 37 (FIGS. 1 and 2).

Downstream of the current transformers for measuring and protection 49, the distribution system 51 comprises for each module 1a, 1b a respective current transformer for the grounding directional protection 55, that, is apt to detect single-phase ground failure at each line assembly 1b.

Of course, this is a purely schematic and exemplified representation: the assemblies 1a, 1b can be arranged onto more rows and in particular onto two flanked rows, as will be apparent hereinafter with more detail.

The present invention relates both to transformer assemblies 1a and to line assemblies 1b. They do not differ in the voltages, that are obviously the same, but for the rated currents for which they have to be sized.

In particular, the rated current for the transformer assemblies 1a will be approximately double with respect to the current for the line assemblies: to a rated voltage of 24 kV the rated currents shall be 1250 A and 630 A, respectively.

Therefore, said assemblies 1a, 1b will have the same structure, but with different electrical sizing; in particular, the dimension will vary widthwise due to the higher number of input conductors used in the assembly transformer 1a.

With reference in particular to FIG. 1, a multi-pole breaker assembly is indicated as a whole with 1. It is of the three-pole type, comprising a bay 2 of protected type (FIG. 3), with metal walls, usually included in a medium voltage distribution system for primary stations. For medium voltage is intended, in general, a voltage derived by the transformation of the long distance line high voltage and of the order of 10–20 kV and anyhow comprised in the range between 1 and 52 kV.

Briefly, such assembly 1 corresponds to the aforecited line assembly 1b.

Figure 3:
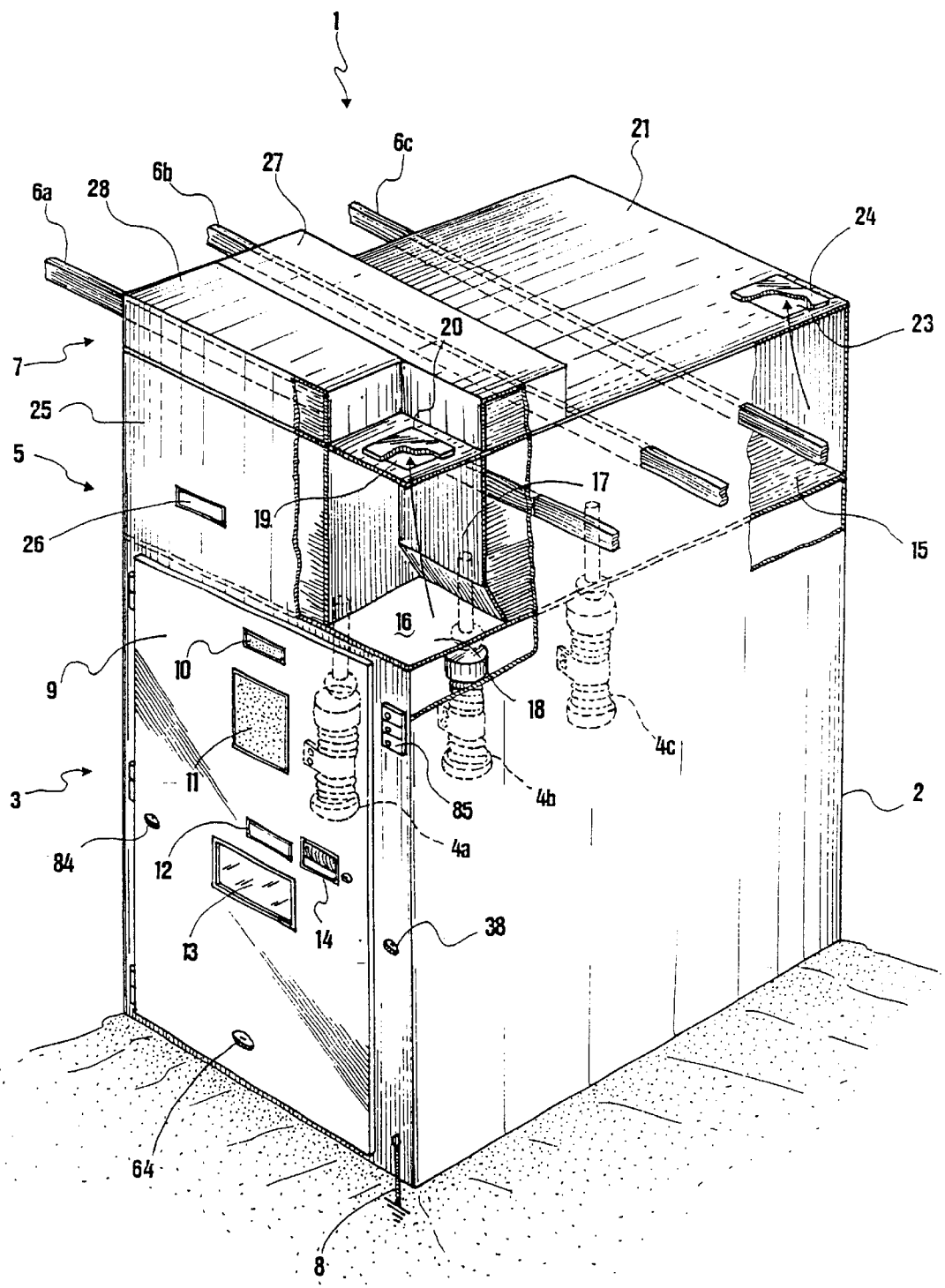
FIG. 3 shows a partial section and perspective view of the assembly of FIG. 1, with particular reference to the external details.

With reference to FIG. 3, the bay 2 is formed by a box-like casing of elongated parallelepiped shape, developed heigthwise, and consists of three superimposed chests: a first lower chest 3 housing a set of three breakers 4, indicated with 4a, 4b and 4c respectively, a second intermediate chest 5 housing a corresponding set of three bus bars 6, indicated with 6a, 6b and 6c respectively, and an upper chest 7 having some service cable compartments 27, 28 that will be detailed hereinafter.

The lower chest 3 comprises, a grounding 8 at the bottom thereof, and, at its front access side thereof, a door 9, laterally journalled, having, from top to bottom : a tag holder 10 for the line identification; a plate 11 reporting the steps sequence and the synoptic scheme; a first inspection opening 12 usually closed with a metal cover, apt to be used for the optical detecting of the temperature of the conductors; an inspection window 13 of the lower chest 3, to visually detect the position of the breakers and of the grounding blade switch 50 on the inside; and a handle 14. Beside the door 9 the lower chest 3 has, on the same front access side, light detectors 85 detecting a voltage presence or absence in the medium voltage cables.

The handle 14 is of the recessed type, at the same level of the door 9 surface to limit dimensions.

Between the metal walls of the lower chest 3 and the breakers 4a, 4b, 4c, as well as among each of said breakers 4a, 4b, 4c, the needed dielectric strength, required by the effective safety rules, is provided with appropriate air insulation distances that shall be strictly kept regardless of the operative position of the breakers 4a, 4b, 4c be.

The intermediate chest 5 houses and is transversally passed through by the bus bars 6a, 6b, 6c that remain parallel to the rear and top walls.

The bus bars 6a, 6b, 6c, are supplied by a high voltage-medium voltage AT/MT transformer (FIG. 4) ending up at a high voltage line at the present assembly 1. The bus bars 6a, 6b, 6c in turn supply corresponding medium voltage MT lines(see assemblies 1b-FIG. 4).

Said intermediate chest 5 is separated from the lower chest 3 with a transversal baffle 15, serving as a roof of the lower chest 3, and is passed through heigthwise by a chimney path 16, comprising a vent duct 17 extending from a first vent opening 18, formed in said first transversal baffle 15, to a second vent opening 19, formed onto the top of the bay 2, outletting on the outside thereof and closed by a first flap 20.

The first flap 20 is apt to open outwards of the bay 2, allowing the venting of the products of a possible explosion, caused by an uncontrolled discharge in the lower chest 3. In absence of internal overpressures, the first flap 20 keeps the chimney path 16 closed, thus preventing the external agents access.

The chimney path 16 extends with a suitable vent duct not represented, to convey into a safety area the gases possibly produced by said discharge.

The intermediate chest 5, defining the cell of said bus bars 6a, 6b, 6c, is upperly delimited by a rectangular roof 21, whereto a set of three insulators, indicated with 22a, 22b, 22c, respectively, is fixed, arranged diagonally and facing downwards, supporting said corresponding bus bars 6a, 6b, 6c.

Moreover, the roof 21 has a third and further vent opening 23 outletting outwards and that is closed with a second and further flap 24.

The second flap 24 as well is apt to open outwards of the bay 2, allowing the venting of the products of an explosion in the intermediate chest 5. In absence of internal overpressures, the second flap 24 keeps the third vent opening 23 closed, preventing the external agent access.

For said opening 23 there will be a vent duct corresponding to the aforecited one and not represented.

Furthermore, the intermediate chest 5 has, at its front access side that is coplanar to the one of the lower chest 3, an access wing 25 to the cell of the bus bars 6a, 6b, 6c comprising a second inspection hole 26, apt to be used for the optical detection of the internal conductors temperature, usually closed by a metal wall.

The upper chest 7 is mounted onto the top of the bay 2, i.e. the roof 21, and comprises a service cable compartment 27 or tunnel cableduct in a transverse and central position, containing the low voltage conductors used for the drive and the control of the present assembly; and a compartment or protection and control panel 28, containing the usual instruments of protection and control.

Said compartments 27, 28 comprise a box-like structure independent from the bay 2, apt to be fixed onto the roof 21 with usual carpentry works.

All the abovementioned chests 3, 5, 7 are realised in cells with a metal shell, to effectively contain possible arcs internal to bay 2.

Inside the lower chest 3, said multi-pole breaker assembly 1 according to the present embodiment comprises a set of breakers, one for each pole, i.e. said set of three breakers 4a, 4b, 4c arranged vertically and substantially lying onto a median vertical plane that is perpendicular to the direction of said bus bars 6a, 6b, 6c.

In other words, each breaker 4a, 4b, 4c includes a respective insulating feedthrough 29, preferably of the type made of an organic material, e.g. resin or elastomer, having a substantially cylindrical shape and therefore developing along a main direction forming the median axis of said breaker 4a, 4b, 4c. The insulating feedthrough 29 is further provided with suitable fins to improve the electrical insulation thereof.

Said median axes, respectively indicated with A, B, C, of the breakers 4a, 4b, 4c of said assembly 1 are substantially parallel therebetween and define said median plan perpendicular to the bus bars 6a, 6b, 6c.

According to the present preferred embodiment, said breakers 4a, 4b, 4c are of the vacuum bottle type, that is housed inside said insulating feedthrough 29 and is preferably made of an inorganic material, i.e. for instance ceramics.

The vacuum bottle is generally of the type enclosed by metal plates and containing a first conductor rod carrying, in the end internal to the vacuum bottle, a fixed internal contact and, at the other end thereof, is connected to a first external jaw terminal 30, set onto the top of the respective breaker 4a, 4b, 4c and in line with the corresponding median axes A, B, C.

Furthermore, the vacuum bottle is generally of the type comprising a second conductor rod carrying in the end internal to the vacuum bottle, a movable internal contact and, at the other end, is connected to a second external jaw terminal 31, provided laterally of the respective breaker 4a, 4b, 4c at the bottom thereof.

Each breaker 4a, 4b, 4c is provided with drive means 56 for the cut-off and the make of the respective circuit, i.e. to control the position of the movable internal contact with respect to the fixed internal contact. Said driving means are of the rocking lever type, connected to said second conductor rod.

Said drive means 56 are operated for the connection by a control 32, adjacent to said breakers 4a, 4b, 4c.

The breakers are supported and connected to said control 32 with a transversal supporting arm 33, integral thereto, containing also a control shaft, schematically represented and indicated with 57, kinematically linking the control 32 and the driving means of each breaker 4a, 4b, 4c.

The control 32 is conveniently faced to the door 9 to obtain a faster and more practical accessibility by an operator.

Said breakers 4a, 4b, 4c are apt to be moved with respect to respective input and output external contacts to carry out a line disconnection. In the present embodiment, the external output contact of the assembly 1 consists of said bus bars 6a, 6b, 6c that are arranged onto the vertical, i.e. onto the median axis, of each first external jaw terminal 30.

With reference to said motion to carry out the disconnection, at the supporting arm 33 the breaker assembly 1 comprises laterally at least one bush 74, projecting itself outwards, engaged in a respective slide bar 75 parallel to said median axes A, B, C.

The slide bar 75 is secured to the metal walls of the bay 2 so as to keep a predetermined position, thus defining an operational pathway followed by the breakers 4a, 4b, 4c that move from the disconnection position to the connection position and vice versa.

The assembly 1 further comprises second external contacts 34, provided laterally to the respective breaker 4a, 4b, 4c, supplied by a specially provided electrical duct 35, i.e. medium voltage cables outgoing from the primary station.

In case of a line assembly 1b (FIG. 4), as in the present embodiment, each electrical duct is directed to a medium voltage network and is therefore sized for a predetermined rated current (e.g. 630 A at 24 kV); in this case the second external contacts 34 will have to be considered as output contacts.

On the other hand, in case of a transformer assembly 1*a* (FIG. 4), such duct 35 will be doubled in order to ensure an approximately doubled capacity (1250 A at 24 kV). In this case, said second external contacts 34 shall have to be considered as ingoing contacts.

A pair of ducts 35 extend outside the bay 2, reaching the respective measuring and protection current transformers 49.

The second external contacts 34 are arranged onto the vertical, i.e. onto the median axis, of the respective second external jaw terminal 31.

In other words, said breakers 4*a*, 4*b*, 4*c* are arranged in advance thereby the external terminals 30, 31 thereof are arranged onto a rectilinear pathway, substantially parallel to the median axis A, B, C of said breakers 4*a*, 4*b*, 4*c*, intersecting the respective external input and output contacts 6*a*, 6*b*, 6*c* and 34 of the assembly 1.

Said pathway substantially carries out the operational path physically determined by the slide bars 75 and by the bushes 74.

The medium voltage cables 35 are supported onto the metal walls of the lower chest 3 of the bay 2 by a specially provided support which is not represented.

The second external contact 34 is in turn supported onto said metal walls of the bay 2 by a strain insulator, indicated with 36*a*, 36*b* and 36*c* respectively, having a grounding blade switch of the electrical duct 35 indicated with 50 in FIG. 4.

Such grounding blade switch comprises a disconnection blade 37 hinged to said metal walls and that can be operated in rotation with a control slot 38 placed laterally of said door 9.

The blade 37 forms the disconnection of the grounding 50 represented in FIG. 4.

On the other hand, as to the contacts and the upper terminals 6*a*, 6*b*, 6*c*, 30, each first jaw terminal 30 is formed onto an extension of the respective first conductor bar which is contained, once outside the respective insulating feedthrough 29, inside an insulation coatings 39 which is cylindrical, elongated and coaxial to the insulating feedthrough 29.

The intermediate transversal baffle 15 has, at and onto the vertical axis of said first jaw terminal 30 and of said insulation coatings 39, respective passage holes 40 that have a circular shape and are apt to allow the passage of said insulation coatings 39 with a minimal allowance.

Such passage, as will be detailed hereinafter, is determined by the hoisting of the breakers 4*a*, 4*b*, 4*c*, i.e. by a vertical translation thereof, from a disconnection position to a connection position.

In an intermediate position onto the insulation coatings 39, each breaker 4*a*, 4*b*, 4*c* has a sealing member 41, cup-shaped and conveniently made of an at least partially flexible insulating material, for instance a semirigid rubber, for the protection against possible internal arcs. The edges of said sealing members 41 are apt to abut on the first intermediate transversal baffle 15 in a connection position, sealing the passage holes 40, to prevent the propagation of overpressures and/or discharges deriving from an internal arc that might affect both the lower and intermediate chests 3, 5.

Thus, when the breakers 4*a*, 4*b*, 4*c* are hoisted and in a connection position, the lower chest 3 and the intermediate chest 5 are anyhow separated and insulated therebetween by the transversal baffle 15 and by the mutually co-operating sealing members 41.

Moreover, said transversal baffle 15 has a shutter 42, i.e. a metal plate that is synchronously movable with the motion of the breakers 4*a*, 4*b*, 4*c* thanks to a kinematic chain symbolically represented with a push rod 58, apt to occlude said passage holes 40 when the breakers 4*a*, 4*b*, 4*c* are lowered, i.e. in disconnection position.

The breakers 4*a*, 4*b*, 4*c* and the control 32 are supported by a supporting platform member 43.

The assembly 1 according to the invention further comprises means for translating said breakers 4*a*, 4*b*, 4*c* along a direction having a main component substantially parallel to said median axes A, B, C to carry out said line disconnection and said connection.

In particular, said direction is substantially vertical and parallel to said median axes A, B, C to realise the movement of said external terminals 30, 31 along said pathway intersecting said external input and output contacts 6*a*, 6*b*, 6*c*-34.

Said means for translating comprise an elevator device 44 provided below said supporting platform member 43.

In the present embodiment, such elevator device 44 is of the mechanical driving type and comprises a pantographic system with crossed arms 45 with respect to pins 59, said system being driveable by operating on a screw shaft 46 that allows the wide opening of said arms 45 having a respective hinged end 60 and movable ends 61, provided with appropriate rolling members, running onto specially provided upper tracks 62 and lower tracks 63 of the elevator device 44.

Of course, a wide range of alternative elevator devices 44 apt to this use can be used, manually driveable or the like. It is possible to provide for instance a system using pulleys or different mechanical systems with worm or gear drives, etc.

In the present embodiment, the screw shaft 46 is operated manually, through the door 9 thanks to a first drive hole 64 formed therein, with a crank tool 47 thanks to the moderate weight of the breakers 4*a*, 4*b*, 4*c*, usually not exceeding 100 kg.

To this purpose, the screw shaft 46 has a suitable socket 48, for the mechanical engagement of the crank tool 47, arranged below the control 32, and is connected to a reduction gear 65.

When the pantographic system is in a retracted position, i.e. the set of breakers 4*a*, 4*b*, 4*c* and control 32 is lowered in a disconnection position, the entire system formed by the breakers 4*a*, 4*b*, 4*c*; the control 32; the supporting arm 33; and the platform member 43 can be extracted from the bay 2 through the door 9.

To this purpose, the elevator device 44 has at the top drive means for the extraction and the insertion of said platform member 43, comprising a grooved, parallel and opposite pair of rectilinear slideways 66, consisting of C-section beams facing each other, fixed to the upper ends 61 of said crossed arms 45.

Outside each C-section beam 66 a respective upper track 62 is formed for the corresponding movable ends 61.

The slideways 66 determine an extraction and insertion path of said breakers 4*a*, 4*b*, 4*c*, and in particular for said platform member 43 that is provided laterally of sliding members, i.e. supporting wheels 67, apt to be inserted in said slideways 66, that forms sliding means of said platform member 43 with respect to the drive means of the elevator device 44.

In other words, said platform member 43, provided with wheels 67, forms the trolley of a movable apparatus and as will be detailed hereinafter, that can be extracted, comprising parts integral therebetween and that will be fully listed hereinafter.

At said platform member 43, said breaker assembly 1 comprises first positioning means 68 of the breakers 4a, 4b, 4c along said insertion and extraction path.

The first positioning means 68 comprise respective first movable catch members 69, provided so as to be integral with said platform member 43, and second fixed catch members 70, provided so as to be integral with said drive means for the extraction and the insertion thereof, i.e. the slideways 66, said first and second catch members 69, 70 apt to be associated in mutual engagement when the breakers 4a, 4b, 4c are positioned, along the insertion and extraction path, at said passage holes 40 i.e. of the first external contacts 6a, 6b, 6c.

According to the present embodiment of the assembly breaker 1, said first movable catch members 69 comprise a respective catch pin, indicated with the same reference number, mounted onto a first supporting rod 71 rotatably connected to said platform member 43.

Each catch pin 69 is faced to the corresponding slideways 66 and is pushed onto it by a first compressing elastic member 72, i.e. a spring in the present embodiment example, supported by the platform member 43.

At their free ends, the supporting rods 71 comprise respective insertion handles 73, provided onto the front side of the platform member 43.

According to the present embodiment of the breaker assembly 1 according to the invention, said second fixed catch members 70 comprise a respective catch hole, indicated with the same reference number, apt to receive in engagement said catch pin 69 when the breakers 4a, 4b, 4c are positioned, onto the insertion and extraction path, at said passage holes 40 i.e. of the first external contacts 6a, 6b, 6c.

The catch holes are directly formed into the respective slideways 66.

When the pins 69 are engaged in the respective holes 70, i.e. when the supporting rods 71 and the insertion handles 73 are in the position given by the connection position, an appropriate system, not represented, provides the allowance for the breakers 4a, 4b, 4c hoisting by the elevator device 44.

Moreover, the closing of the door 9 is possible only with the catch pins 69 in an engaged state.

Correspondingly of said supporting arm 33, said breaker assembly 1 comprises second and further positioning means 76 of the breakers 4a, 4b, 4c along said operational path between the disconnection position, lowered, and the connection position, hoisted.

The second positioning means 76 comprise respective further first movable catch members 77, arranged so as to be integral with said supporting arm 33, i.e. with said breakers 4a, 4b, 4c, and further second fixed catch members 78, arranged so as to be integral with the drive means for the disconnection and the connection, i.e. a slide bar 75, said first and second catch members 77, 78 being apt to be associated in mutual engagement when the breakers 4a, 4b, 4c are positioned in the connection position.

According to the present embodiment of the assembly breaker 1 according to the invention, said third movable catch members 77 comprise a respective pawl, indicated with the same reference number, provided onto a second supporting rod 79 rotatably connected to said supporting arm 33 at a joint 80.

Each pawl 77 is faced to the corresponding slide bar 75 and is pushed against it by a second compressing elastic member 81, i.e. a spring in the present embodiment, supported by the supporting arm 33.

On the slide bar 75, said fourth catch member 78 is obtained, comprising a cleft, indicated with the same reference number, that is apt to receive in engagement said pawl 77 when the breakers 4a, 4b, 4c are provided in the hoisted position of connection.

The breaker assembly 1 further comprises a drive rod 82 connected to said joint 80 and terminating with a drive end 83 at the front metal wall of the bay 2.

The door 9, at said drive end 83, has a second drive hole 84 (FIG. 3) to drive said second positioning means with a not represented suitable tool.

When the pawl 77 is engaged with the respective cleft 78, a suitable system, not represented, provides the allowance to the driving of the drive means 56 for the make of the circuit inside of the feedthrough insulators determined by the breakers 4a, 4b, 4c.

The operation of said assembly 1 will be described hereinafter, with reference to FIGS. 1 and 2.

In FIG. 1, the breakers 4a, 4b, 4c are in disconnection position: the elevator device is lowered, with the arms 45 mutually superimposed.

The terminals 30, 31 of the breakers 4a, 4b, 4c are on a rectilinear pathway having a main component thereof which is parallel to said median axes A, B, C, i.e. the path of the external terminals 30, 31 determined by the elevator device 44 is substantially vertical and parallel to said median axes A, B, C.

Said pathway intersects the respective external contacts, be it the bus bar 6a, 6b, 6c or the second external contact 34.

In particular, between each external terminal 30, 31 and the respective input and/or output external contact 6a, 6b, 6c, 34 there is a predetermined disconnection distance 54, determined under safety requirements. In the heredescribed case, such distance is of about 30 cm, that is therefore also the length of the operative path between the disconnection position and the connection position.

In FIG. 1, the assembly 1 is represented with the breakers 4a, 4b, 4c in an insertion position corresponding to the disconnection position.

To proceed from an extracted position to the insertion position, it is necessary to insert the supporting wheels 67 inside the slideways 66; push the platform member 43 along said insertion and extraction path; operate onto the insertion handles 73 in opposition to the action of the first elastic member 72 to allow the passage of the catch pins 69 inside of the slideways 66; and, always operating on said handles 73, ease the engagement of said pins 69 in the respective catch holes 70.

Now the external terminals 30, 31 and the external contacts 6a, 6b, 6c, 34 are in the aforedescribed position. Therefore, the closing of the door 9 is made possible: the next steps might be carried out with the door 9 closed, through the drive holes 64, 84 with the provided tools, in particular the crank tool 47 for the hoisting of the breakers 4a, 4b, 4c.

To operate the connection of the line, firstly it is necessary to operate the cut-off of the grounding blade switch 50.

Then, the elevator device 44 is driven with the crank tool 47 until operating the manual hoisting of the platform member 43 and of the set of three breakers 4 until a substantial connection between each external terminal 30, 31 and the respective input or output external contact 6a, 6b, 6c, 34 is obtained.

The positioning is carried out with said second positioning means 76. When the pawl 77 is engaged with the respective catch cleft 78, then the jaw terminal 30, 31 and the external contacts 6a, 6b, 6c, 34 are in contact, so as to allow the flow of the provided current, i.e. the rated value thereof, without problems.

The engagement between the pawl 77 and the cleft 78 occurs automatically with a mechanical release: the position of the cleft 78 ensures the meeting of said requirements.

In particular, the width of the cleft 78 defines, at said external electrical contacts, an optimal contact zone regardless of possible allowances, producing an adequate predetermined penetration of the jaw terminals 30, 31 into the respective external contacts 6a, 6b, 6c, 34.

Now the circuit can be closed by operating onto internal the contacts of the vacuum bottle, thanks to the allowance obtained by the system that detects the positioning of the pawl 77 inside the cleft 78. The make takes place with a remote drive on the drive means 56 and through the control 32.

These steps are carried out inversely to operate the disconnection.

Once the circuit is cut-off in the vacuum bulbs, always with said remote drive, operating with the suitable tool through the second drive hole 84 it is possible to release the pawl 77 from the cleft 78.

A suitable control system mechanically ensures that such release be possible solely in absence of current.

Now the crank tool 47 is operated to obtain the lowering of the platform member 43, until resetting said disconnection distance 54.

Once the lowering is completed, and after having closed the grounding blade switch 50, it is possible to open the door 9; operate the insertion handles 73 to release the catch pin 69 from the catch hole 70; exert a traction force on said handles 73 to extract all the equipment formed by of the breakers 4a, 4b, 4c, the platform member 43, the control 32 with the drive means 56 and the second positioning means 76.

It is understood that the extraction, as well as the insertion, might for instance take place with the aid of a chute, a system or an equivalent instrument not represented, used for the positioning of said apparatus in front of the elevator device 44, with the supporting wheels 67 of the platform member 43 placed at the right insertion height.

Figure 5:
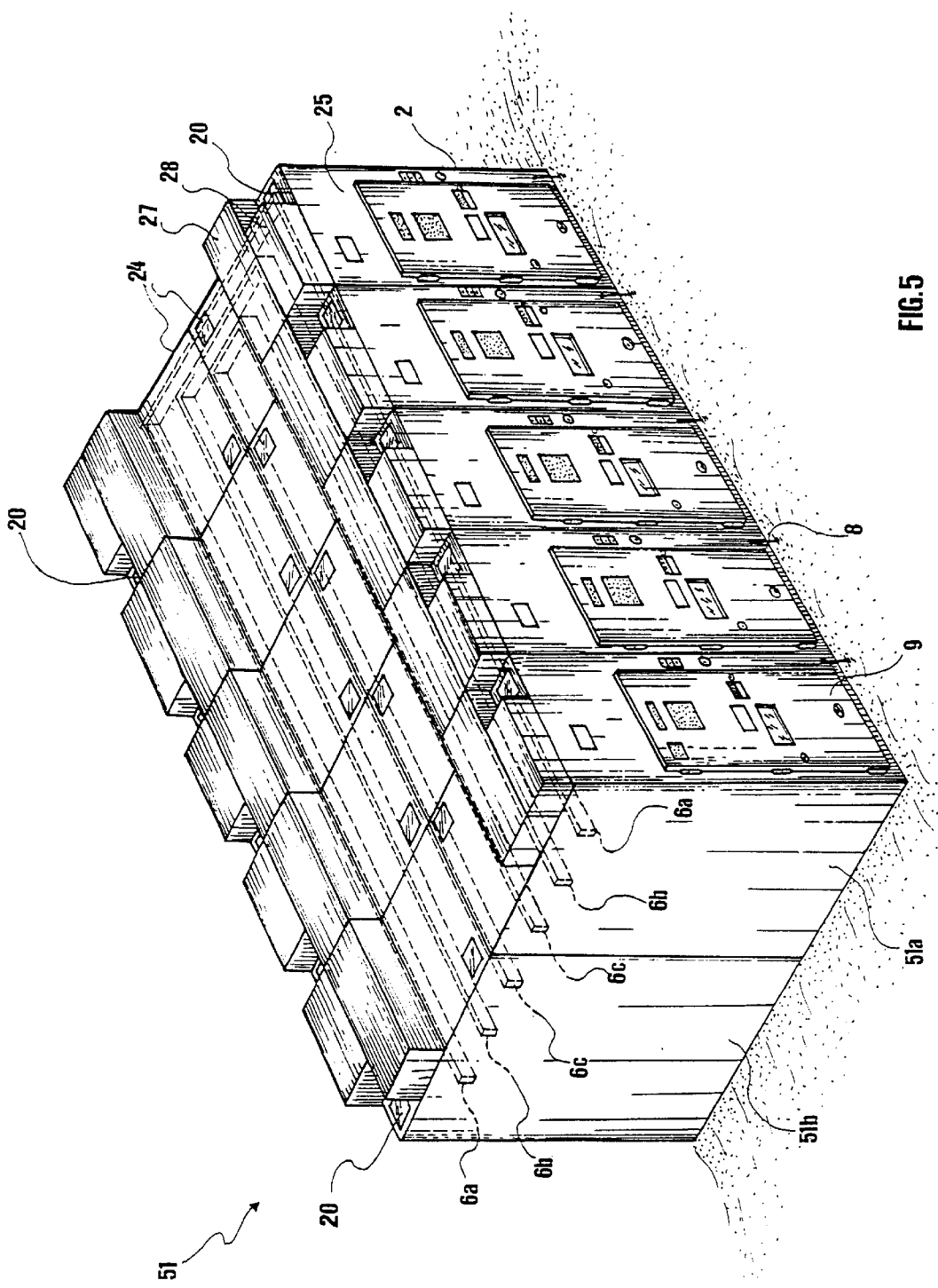
FIG. 5 shows a partial section and perspective view of a distribution system of FIG. 4, having a modular structure.

FIG. 5 shows, as aforedisclosed, a medium voltage distribution system 51, including a multi-pole breaker assembly 1a, 1b of the type abovedescribed with reference to FIGS. 1 and 2.

Said assemblies 1a, 1b are arranged on two rows, indicated with 51a, 51b, of bays 2 arranged with the respective rear side thereof adhering to opposed the bay 2 at the rear side of the latter, in a configuration called shoulder to shoulder.

Thus, the doors 9 of each lower chest 3, as well as the access panels 25 of each intermediate chest 5, are faced to the external sides of the two flanked rows 51a, 51b.

This shoulder to shoulder configuration is allowed by virtue of the fact that the median axes of the breakers substantially lye onto a median vertical plane perpendicular to the front door of the bay. In this way, cables 35, external contact 34 and grounding blade switches 50 are arranged on a lateral side of the bay and can be accessed frontally by the door 9.

In the present embodiment example, the distribution system 51 comprises a total of ten bays 2, i.e. five bays 2 for row 51a, 51b. The distribution system comprises a transformer assembly 1a in a corner position, directly supplied by the AT/MT transformer downstream of an overvoltage discharger 52 represented in FIG. 4.

The distribution system 51 further has the bus bars 6a, 6b, 6c running from the transformer assembly 1a along the first row 51a whereto the latter belongs. Having reached the opposite end of the system 51, the bus bars 6a, 6b, 6c are U-shaped and inversely cross the second row 51b.

In their path, said bus bars 6a, 6b, 6c pass through the other nine line assemblies 1b whereof the distribution system 51 is composed from said transformer assembly 1a.

Such nine line assemblies 1b are completely independent among them, being supplied in parallel by the transformer assembly 1a. Therefore, in normal working conditions they can be cut-off, connected, disconnected, extracted without influencing the remaining ones.

It is to be noted that, thanks to the fact that the breakers housed in the system 51 are translated for the disconnection and the connection thereof along a direction that is substantially perpendicular to the plane defined by the whole system 51, the transverse sizes of the whole distribution system 51 are in no way affected by said translation, though keeping constant the proper air insulation distances inside each bay 2.

Due to this reason, the distribution system 51 has the transversal dimensions reduced to a minimum and in particular the widthwise dimension falls within the so-called road clearance, i.e. 2.5 m, allowing to use the distribution system 51 in movable solutions, to solve accidental situations of breakdowns, failures, or the like.

Furthermore, the above shoulder to shoulder configuration of the bays allows to further reduce the transversal size of the distribution system.

Moreover, operating the system is made extremely easy, the access to all the electrical control instrumentation and to the hoisting means of said assemblies 1a, 1b being particularly easy.

Moreover, it must be noted that the steps of insertion and of extraction of the abovedefined apparatus of the breakers proves to be extremely easy, allowing swift control, maintenance and replacement steps.

The correct positioning of said apparatus inside each bay takes place thanks to the same steps, translation on the horizontal path of insertion and extraction and hoisting, allowing the same insertion.

Moreover, the realisation of the abovedescribed assembly can take place with the use of breakers of the type available on the market, with particular advantages regarding dimension, lightness and ease of handling thanks to the use of breakers of the vacuum bottle type.

To the abovedescribed multi-pole breaker assembly, to the applications thereof, in particular in the field of a medium voltage distribution system to primary stations, and to the operation method of a medium voltage distribution system comprising it, a man skilled in the art, in order to meet further and contingent needs, will be able to carry out several further modifications and variants, all however comprised within the protective scope of the present invention, as defined by the annexed claims.

What is claimed is:

1. A multi-pole breaker assembly, comprising:
a breaker for each pole, each breaker having an insulating feedthrough that develops along a main direction that constitutes a median axis of said breaker, median axes of the breakers of said assembly being substantially parallel to each other, said breakers being integral to one another and moveable with respect to respective external input and output contacts, said external input and output contacts comprising a set of bus bars substantially parallel to each other; and
means for translating said breakers in a direction having a main component that is substantially parallel to said median axes to operate either a line connection or a line disconnection, said median axes substantially lying in a plane perpendicular to said bus bars.

2. The multi-pole breaker assembly according to claim 1, wherein said means for translating comprising at least one elevator device of said breakers according to a direction that is substantially parallel to said median axes.

3. The multi-pole breaker assembly according to claim 2, comprising three poles, said external contacts comprising a set of three bus bars substantially parallel among them and perpendicular to said median axes.

4. The multi-pole breaker assembly according to claim 3, wherein said breakers are housed in a chest of a bay of protected type with metal walls, a required insulating strength being provided between said metal walls and said breakers by an appropriate in air insulating distance kept in a disconnection position, in a connection position and along an operational path between said positions.

5. The multi-pole breaker assembly according to claim 4, wherein said bay comprises a first chest, housing said breakers, and a second chest, housing said bus bars, said first and second chest being separated by a transversal baffle having, for each breaker, a respective passage hole and at least one shutter, synchronously movable with according to the motion of the breakers, apt to occlude said passage holes when the breakers are in the disconnection position.

6. The multi-pole breaker assembly according to claim 5, wherein each breaker has a respective sealing member apt to be abutted onto the said transversal baffle with the breakers in the connection position, sealing said passage holes.

7. The multi-pole breaker assembly according to claim 6, wherein said sealing members are substantially cup-shaped.

8. The multi-pole breaker assembly according to claim 5, wherein said second chest is placed upperly to said first chest and is substantially passed through by a chimney path having at least one vent duct extended between a first vent opening, formed into said transversal baffle, and a second vent opening, formed onto the top of the bay, outletting on the outside and that is closed by at least one respective flap.

9. The multi-pole breaker assembly according to claim 8, wherein said second chest is upperly delimited by a roof having at least one further vent opening outletting on the outside and that is closed by at least one further flap.

10. The multi-pole breaker assembly according to claim 1, wherein each of said breakers comprises a first external terminal onto the top thereof, in line with said median axis, and a second external terminal, arranged laterally of the respective breaker at the bottom thereof.

11. The multi-pole breaker assembly according to claim 1, wherein said breakers are of the vacuum bottle type housed in a respective insulating feedthrough having a cylindrical development defining the corresponding median axis of each breaker.

12. The multi-pole breaker assembly according to claim 11, wherein said breakers and a respective drive means are supported by a supporting platform member, said elevator device being provided below said supporting platform member.

13. The multi-pole breaker assembly according to claim 12, wherein the elevator device is of the mechanical driveable type.

14. The multi-pole breaker assembly according to claim 13, wherein the elevator device is of the type comprising a crossed arms pantographic system, driveable operating onto at least one screw shaft that allows the wide opening of said crossed arms.

15. The multi-pole breaker assembly according to claim 13, wherein the elevator device is operated manually, through a drive hole formed in said bay.

16. The multi-pole breaker assembly according to claim 1, wherein said breakers belong to an extractable apparatus when they are in the disconnection position, said multi-pole breaker assembly comprising drive means for the extraction and the insertion.

17. The multi-pole breaker assembly according to claim 16, wherein said moving member comprises a trolley provided with sliding members apt to be inserted in corresponding grooved slideways, of said drive means for the extraction and the insertion, defining an insertion and extraction path.

18. The multi-pole breaker assembly according to claim 17, comprising positioning means along said insertion and extraction path.

19. The multi-pole breaker assembly according to claim 18, wherein said first positioning means comprise respective first movable catch members, integral with said breakers, and second fixed catch members, integral with said drive means for the extraction and the insertion, said first and second catch members being apt to be joined in mutual engagement when the breakers are positioned, along said insertion and extraction path, at the respective external contacts.

20. The multi-pole breaker assembly according to claim 19, wherein, when said mutual engagement is realised, the allowance is provided to the translation movement of said breakers.

21. The multi-pole breaker assembly according to claim 1, comprising further positioning means along an operational path between a disconnection position and a connection position of said breakers.

22. The multi-pole breaker assembly according to claim 21, wherein said further positioning means comprise respective and further first movable catch members, integral with said breakers, and further second fixed catch members, said first and second catch members being apt to be joined in further mutual engagement when the breakers are placed in a connection position.

23. The multi-pole breaker assembly according to claim 22, wherein, when said further mutual engagement is realised, the allowance is provided to close the respective electrical circuit.

24. A method for operating distribution systems for primary stations incorporating at least one multi-pole breaker assembly, comprising, for each pole, a breaker having an insulating feedthrough developing along a main direction constituting the median axis of said breaker, the median axes of the breakers of said multi-pole breaker assembly being substantially parallel among them, said breakers being integral to one another and apt to be moved with respect to respective input and output external contacts to operate the line connection and disconnection, said external input and output contacts comprising a set of bus bars substantially parallel among them, said method comprising the steps of:

arranging said breakers thereby the external terminals thereof being arranged onto a rectilinear pathway, substantially parallel to the median axes of said breakers, intersecting the respective input and output external contacts, said median axes being substantially vertical and substantially lying onto a median vertical plane perpendicular to said bus bars;

to operate the disconnection, moving said breakers thereby the respective external terminals thereof moving along said pathway from a position of electrical connection until placing themselves at a predetermined disconnection distance; and to operate the connection, moving said breakers thereby the respective external terminals thereof moving along said pathway from said predetermined disconnection distance to carry out an electrical connection.

25. A distribution system of medium voltage for primary stations, comprising at least one multi-pole breaker assembly as defined according to the claim 1.

26. The distribution system according to claim 25, comprising at least one of said multi-pole breaker assembly as transformer assembly; and a plurality of said multi-pole breaker assembly as line assembly, said line and transformer assemblies being passed through by the same bus bars.

27. The distribution system according to claim 26, wherein said transformer and line assemblies are arranged in respective bay in turn arranged shoulder to shoulder along two rows, occupying a widthwise dimension falling within the so-called road clearance.

* * * * *